Figure 1:
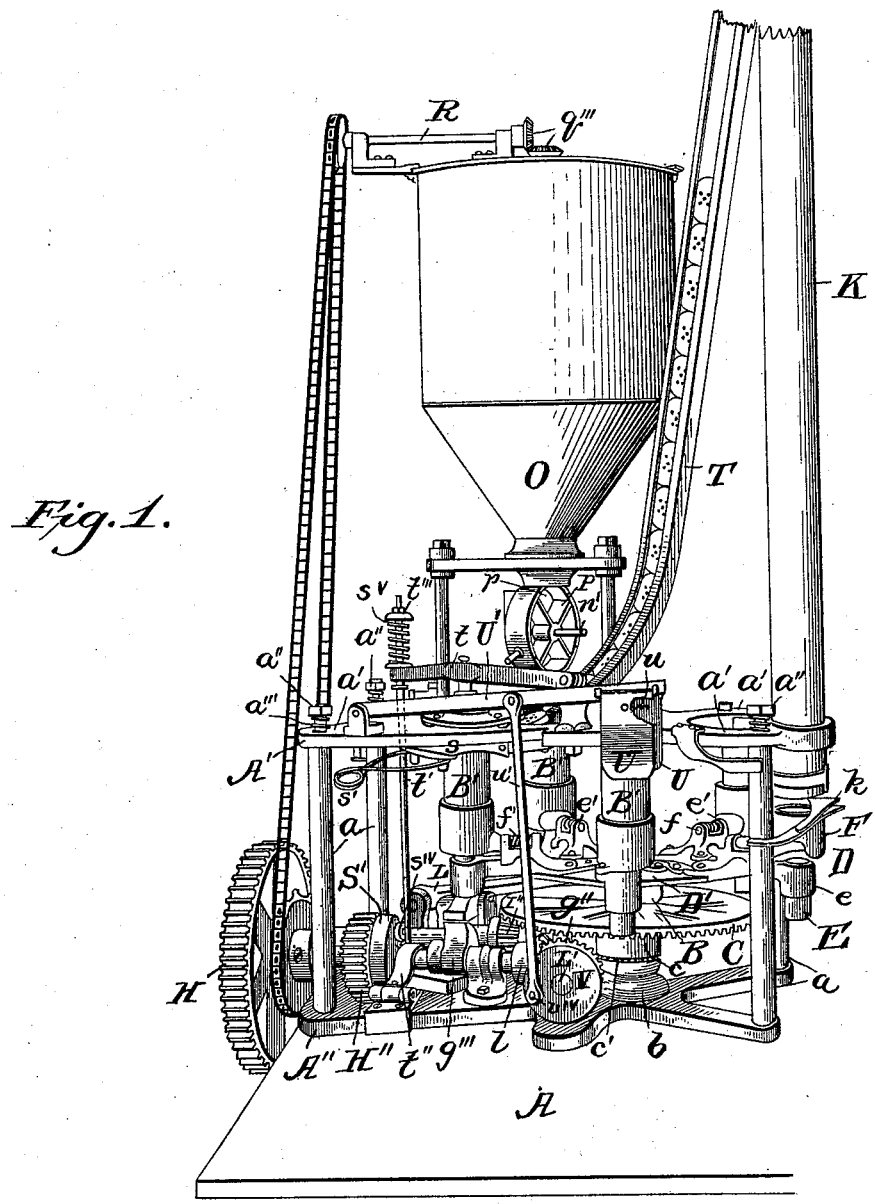

(No Model.) 10 Sheets—Sheet 1.

P. L. HOYTE & W. T. WOOD.
MACHINE FOR FILLING, CAPPING, AND LABELING BOXES.

No. 582,988. Patented May 18, 1897.

Witnesses:
Inventors.
P. L. Hoyte
and W. T. Wood
By Howson & Howson
Attys.

(No Model.) 10 Sheets—Sheet 2.
P. L. HOYTE & W. T. WOOD.
MACHINE FOR FILLING, CAPPING, AND LABELING BOXES.
No. 582,988. Patented May 18, 1897.
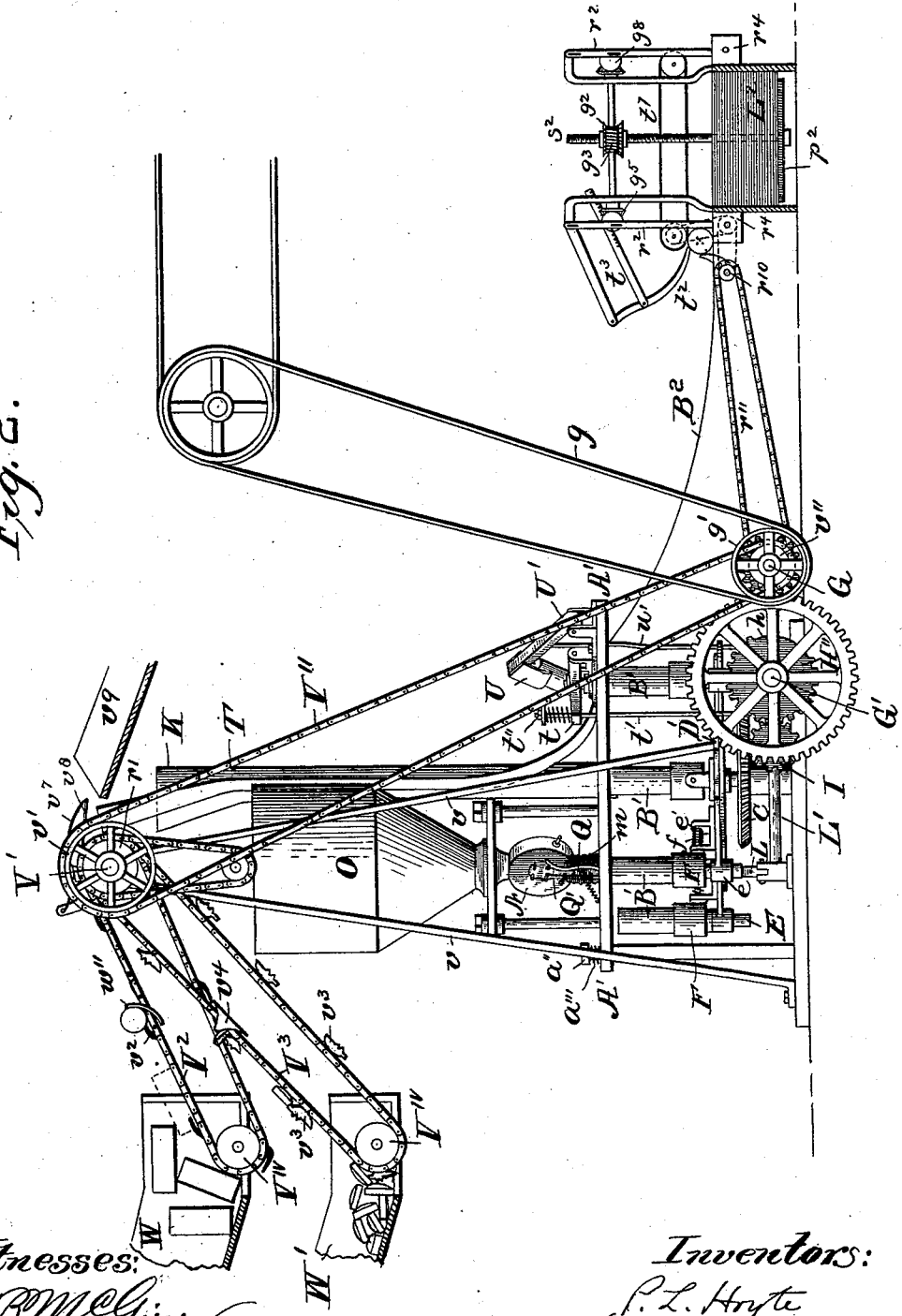
Witnesses:
J. B. McGirr.
J. P. Appleman.
Inventors:
P. L. Hoyte
and W. T. Wood,
By Howson & Howson,
Attys (No Model.) 10 Sheets—Sheet 3.
P. L. HOYTE & W. T. WOOD.
MACHINE FOR FILLING, CAPPING, AND LABELING BOXES.
No. 582,988. Patented May 18, 1897.
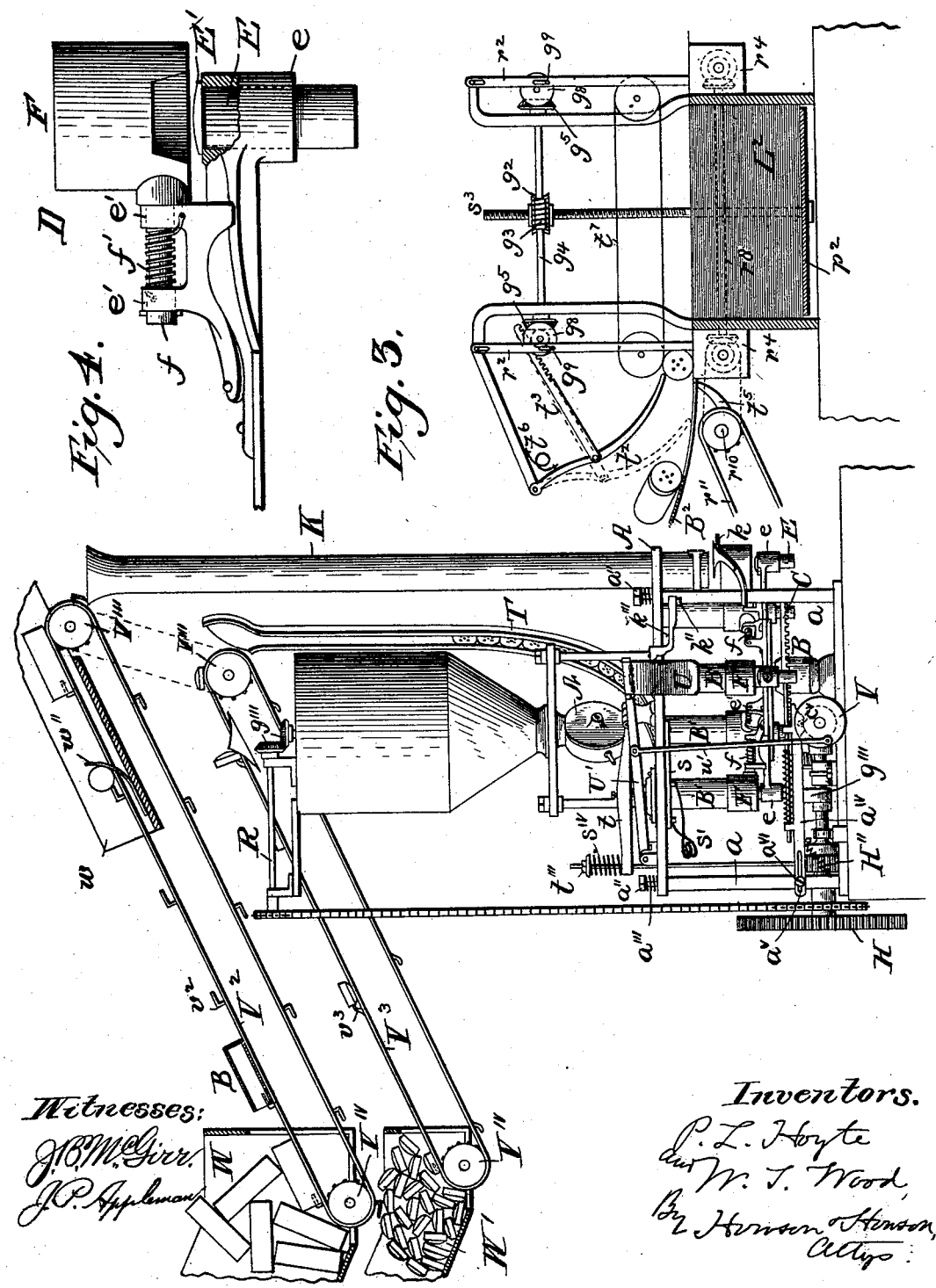

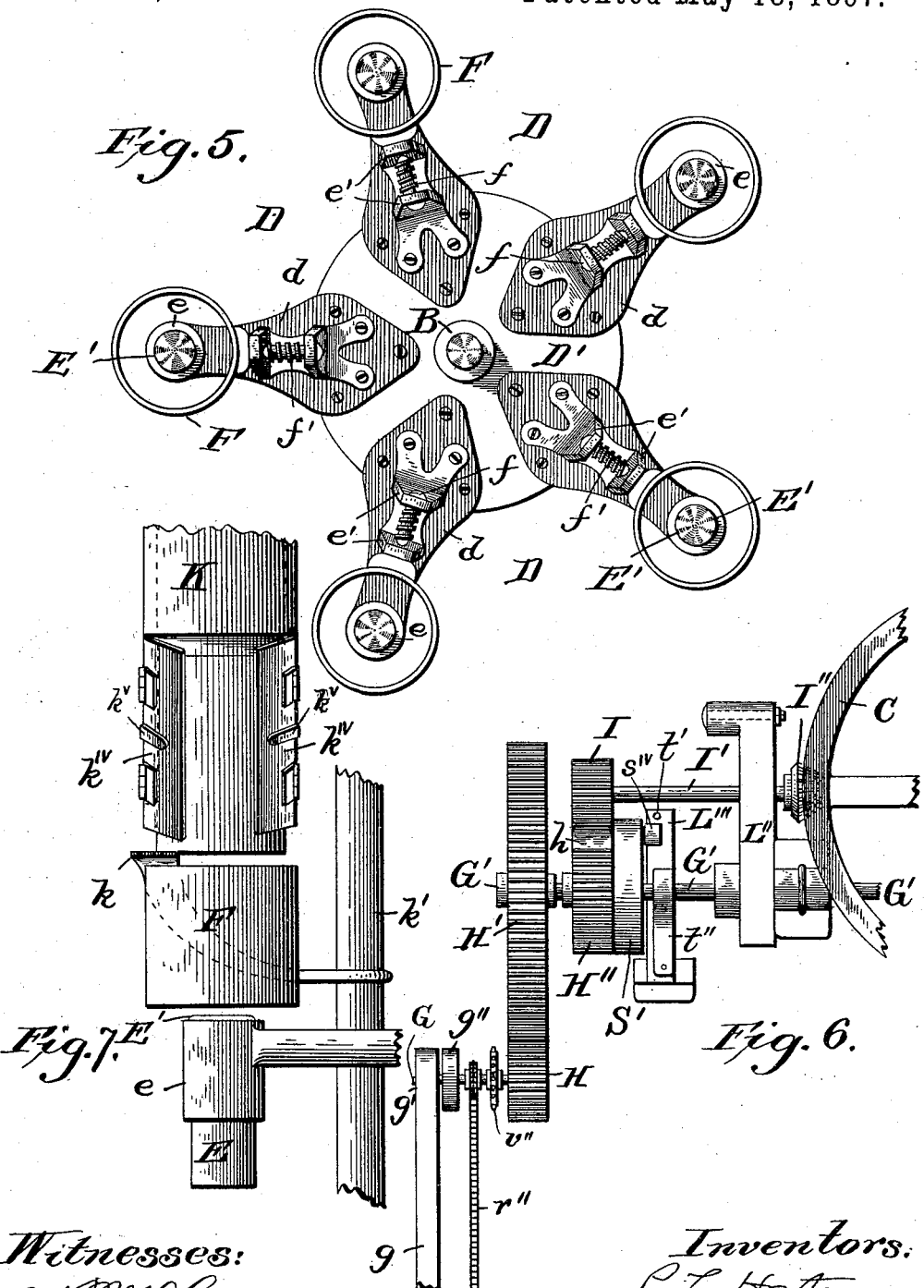

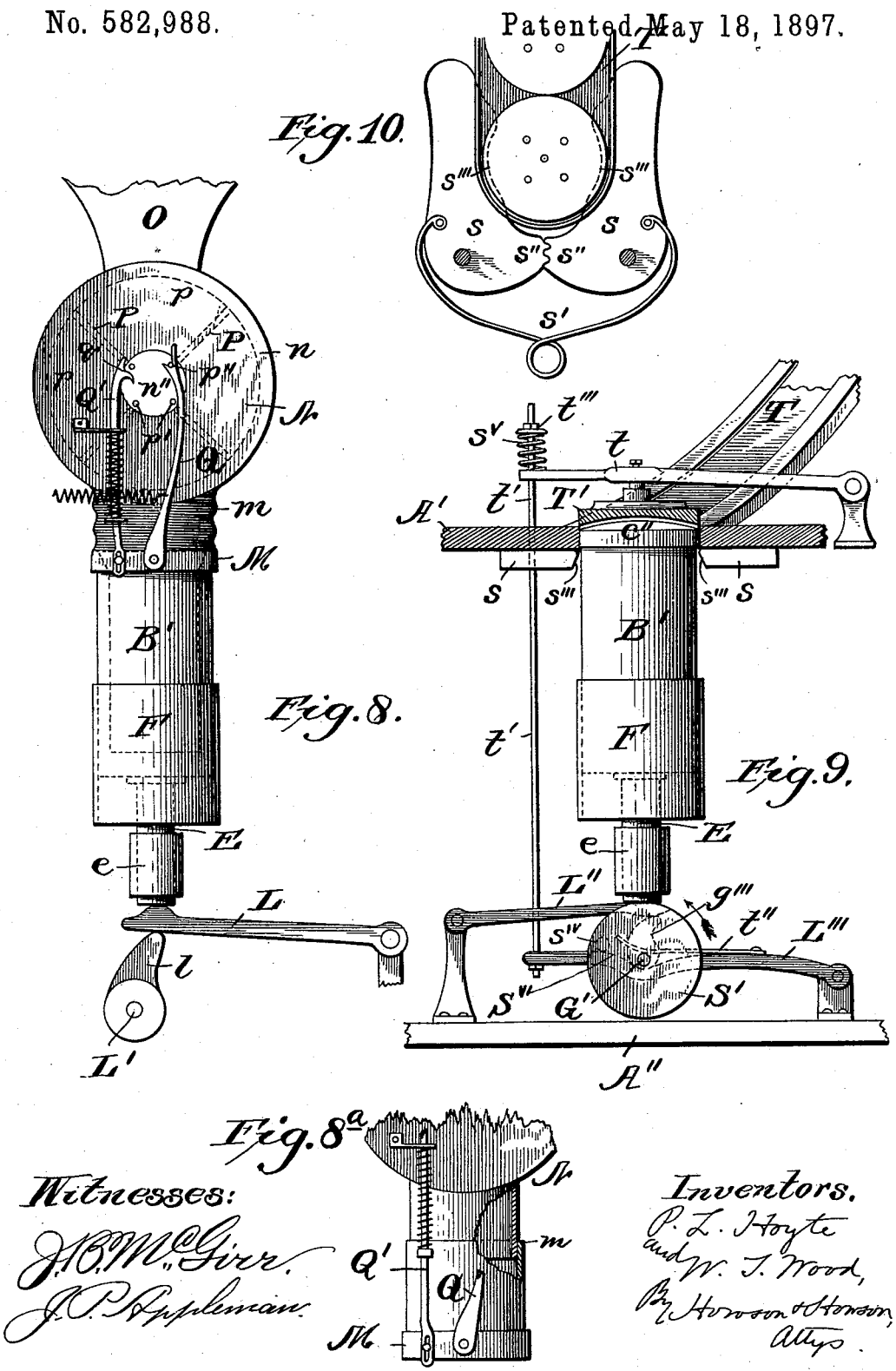

(No Model.) 10 Sheets—Sheet 6.
P. L. HOYTE & W. T. WOOD.
MACHINE FOR FILLING, CAPPING, AND LABELING BOXES.
No. 582,988. Patented May 18, 1897.
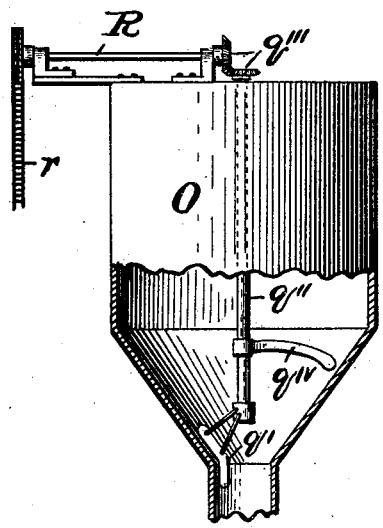
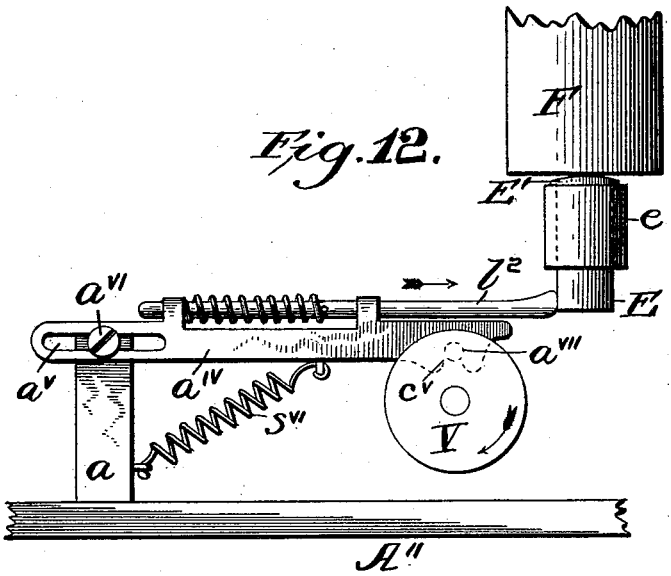
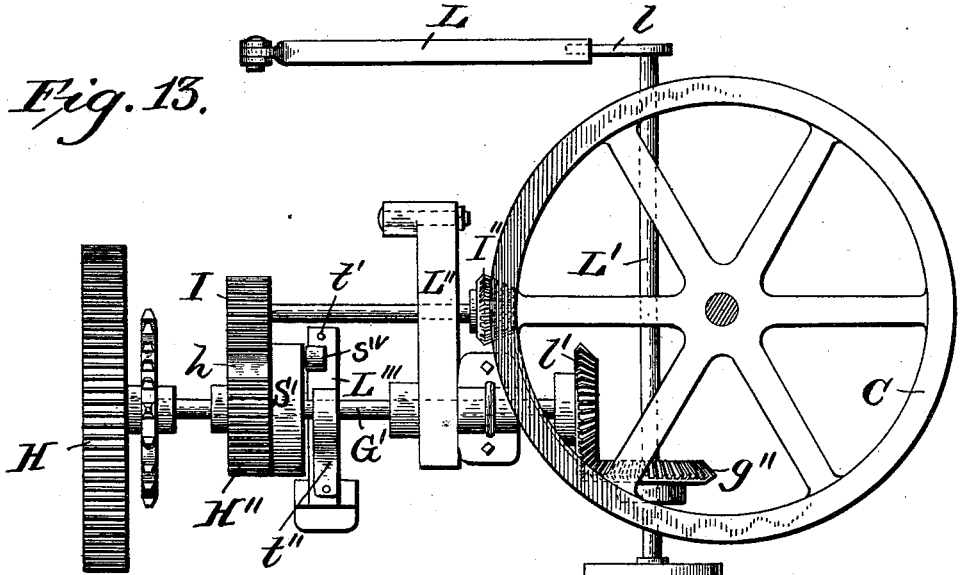
Witnesses: Inventors.

(No Model.) 10 Sheets—Sheet 7.
P. L. HOYTE & W. T. WOOD.
MACHINE FOR FILLING, CAPPING, AND LABELING BOXES.
No. 582,988. Patented May 18, 1897.
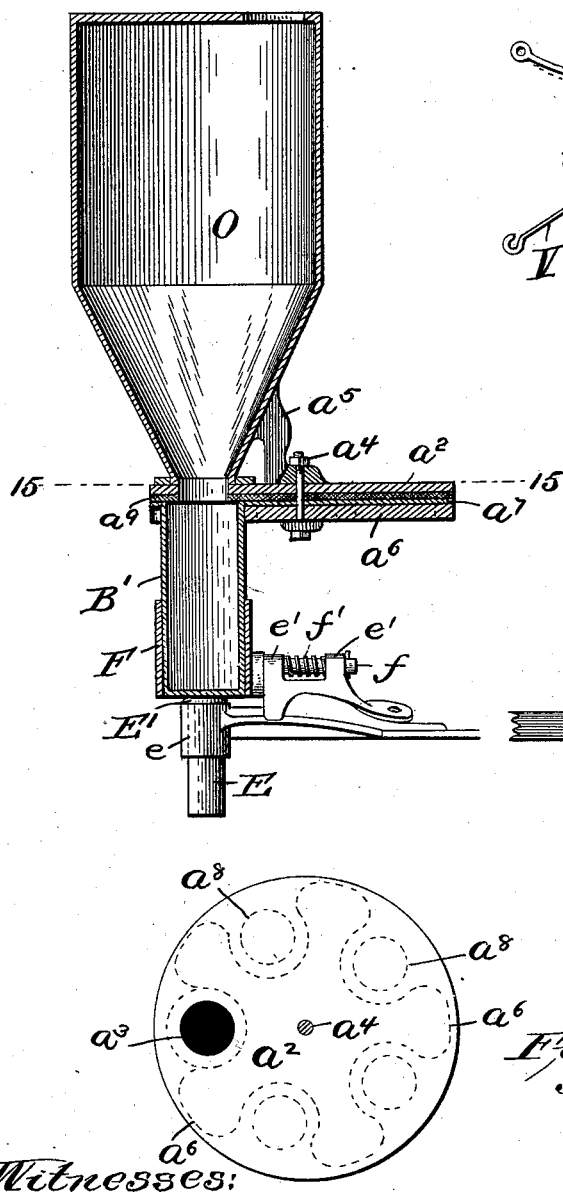
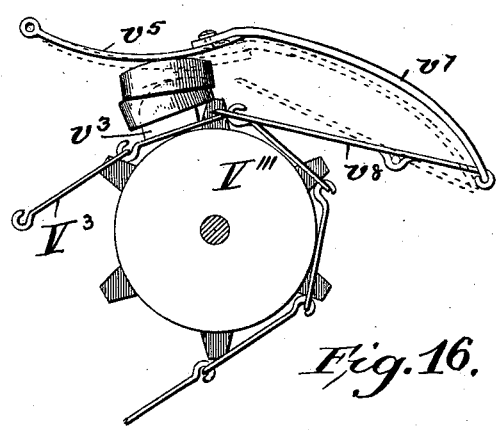
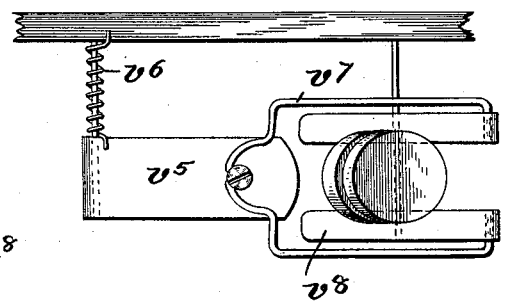

(No Model.) 10 Sheets—Sheet 8.
P. L. HOYTE & W. T. WOOD.
MACHINE FOR FILLING, CAPPING, AND LABELING BOXES.
No. 582,988. Patented May 18, 1897.
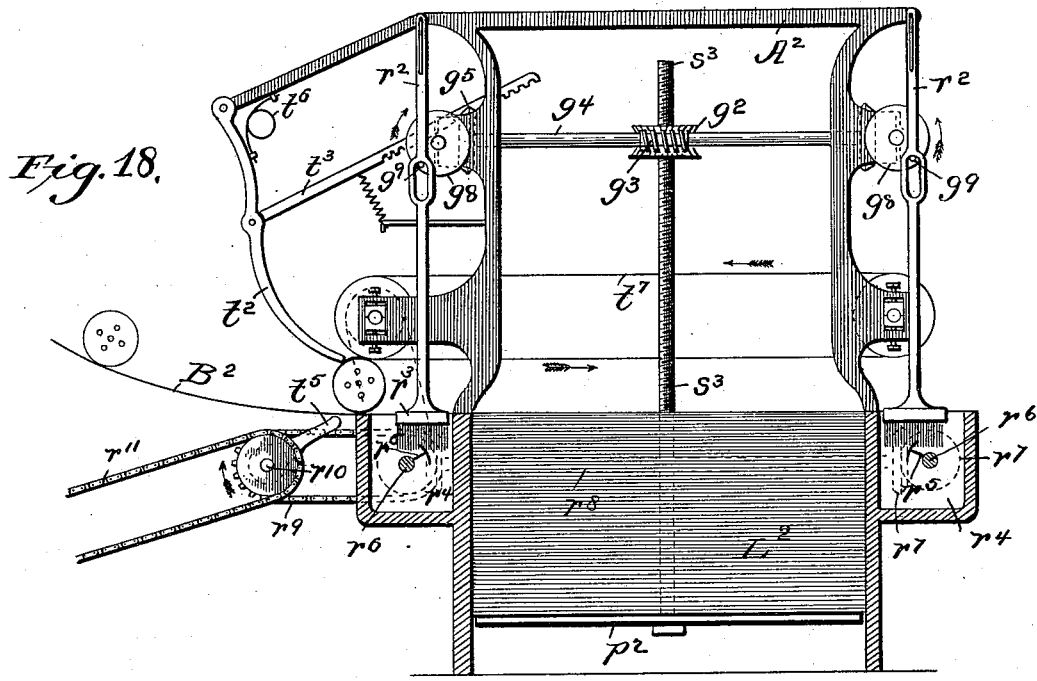
Fig. 18.
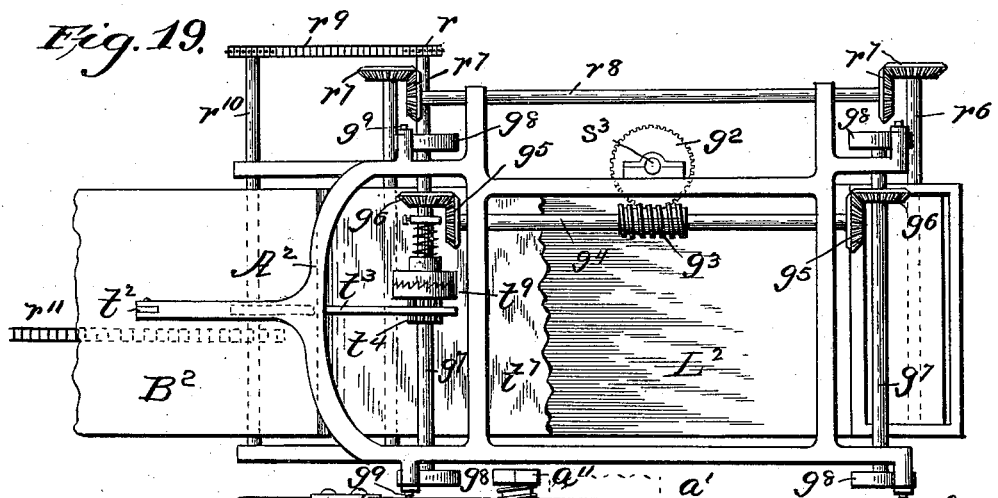
Fig. 19.
Fig. 21.
Witnesses:
J. H. McGirr.
J. P. Appleman.
Inventors:
P. L. Hoyte
and W. T. Wood,
By Howson & Howson,
Attys.

(No Model.) 10 Sheets—Sheet 9.
P. L. HOYTE & W. T. WOOD.
MACHINE FOR FILLING, CAPPING, AND LABELING BOXES.

No. 582,988. Patented May 18, 1897.

Witnesses:
Inventors.
P. L. Hoyte
and W. T. Wood, (No Model.) 10 Sheets—Sheet 10.

P. L. HOYTE & W. T. WOOD.
MACHINE FOR FILLING, CAPPING, AND LABELING BOXES.

No. 582,988. Patented May 18, 1897.

Witnesses:
Inventors.

UNITED STATES PATENT OFFICE.

PHIL L. HOYTE AND WILLIAM T. WOOD, OF NASHVILLE, TENNESSEE; SAID WOOD ASSIGNOR TO SAID HOYTE.

MACHINE FOR FILLING, CAPPING, AND LABELING BOXES.

SPECIFICATION forming part of Letters Patent No. 582,988, dated May 18, 1897.

Application filed February 1, 1897. Serial No. 621,510. (No model.)

*To all whom it may concern:*

Be it known that we, PHIL L. HOYTE and WILLIAM T. WOOD, citizens of the United States, residing in Nashville, county of Davidson, State of Tennessee, have invented Improvements in Machines for Filling, Capping, and Labeling Boxes, of which the following is a specification.

Our invention relates to machines for filling boxes or other receptacles with powdered, granulated, or other substances and capping and labeling the said boxes or receptacles; and our main object is to provide a machine of this character which will automatically fill the receptacle with the material, place the caps or covers on said receptacles, and paste the labels on the same in one continuous operation.

In the description and claims to follow for clearness and brevity we will use the term "box" with the understanding that it is intended to cover cans and other receptacles capable of use in our machine, and in the use of the term "material," for a similar reason, it is understood that we include therein bluing, spices, or other granular material and liquids as well.

Our further objects are to provide mechanism which will automatically feed the boxes and their caps or covers to the filling-machine and devices in connection therewith which will insure the delivery of said boxes and caps or covers to the filling-machine, the former in proper position to receive the material and the latter in proper position to be placed on the boxes; to provide measuring devices for measuring and delivering the proper quantity of material to the boxes; to provide means for causing the box-carrier to operate smoothly in order to prevent shock or jar to the machine; to provide means for relieving the carrier in case a box of greater height than that for which the machine is adjusted happens to be delivered thereto; to provide mechanism for positively releasing the filled and capped box and discharging it from the machine to the labeling mechanism; to provide a labeling device adapted to operate in conjunction with the capping and filling machine for pasting the labels on the boxes, and, finally, to so construct the various parts of the machine that it will perform its intended operation speedily and accurately in order that the complete operation may be carried on without interruptions and in the most efficient manner, while at the same time securing a construction which will be simple and durable and which will operate with the least amount of wear.

With the objects thus generally stated in view our invention consists in the novel mechanism and in the details thereof, as is hereinafter described, and more particularly pointed out in the claims, with reference to the accompanying drawings, in which—

Figure 22:
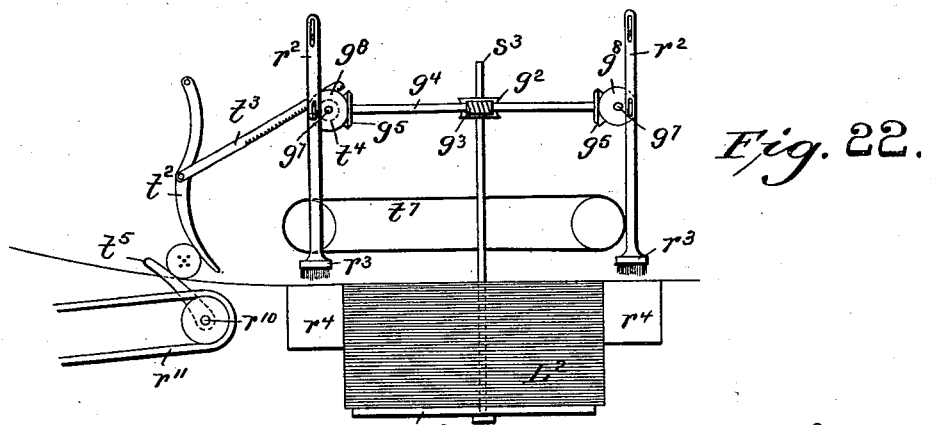
Figure 23:
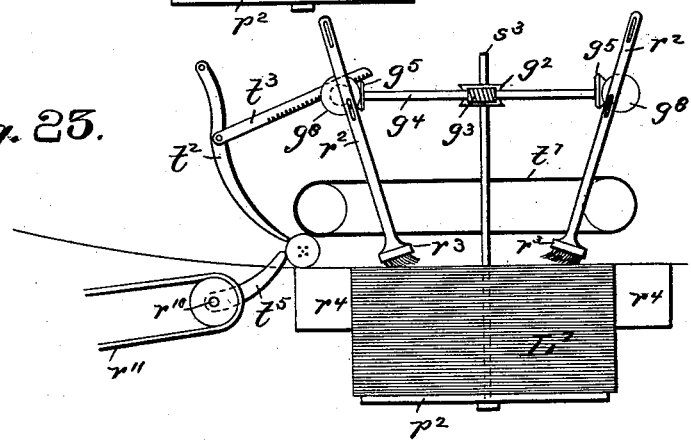
Figure 24:
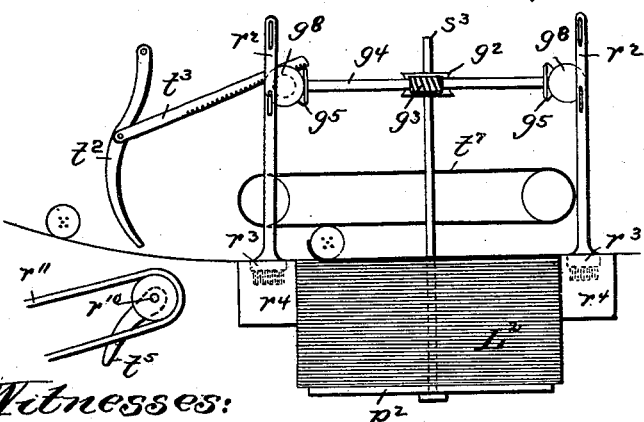
Figure 25:
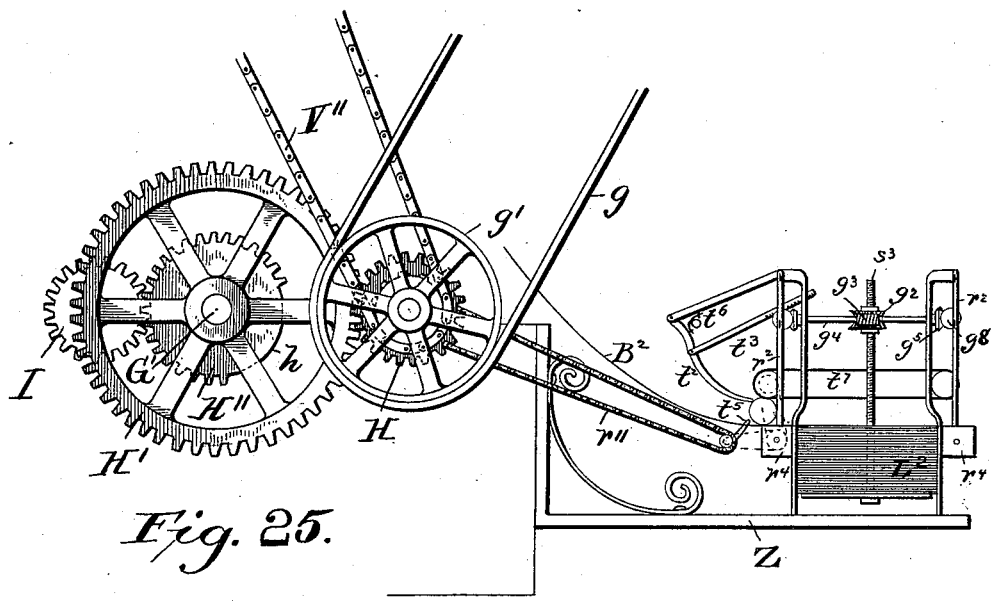
Figure 26:
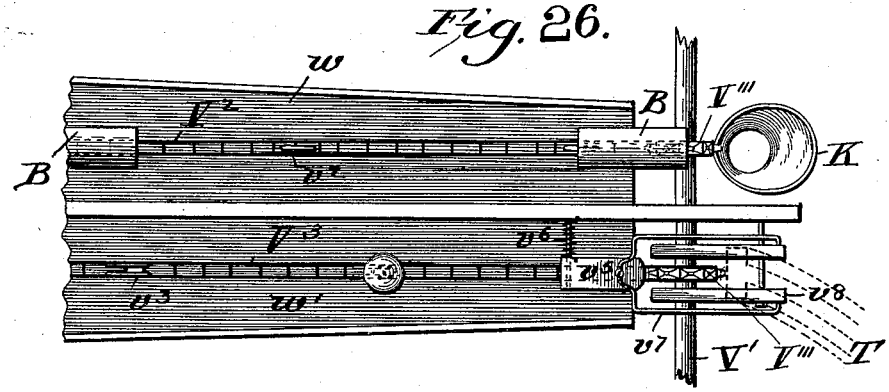
Figure 20:
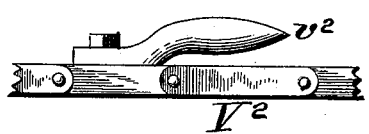
Figure 27:
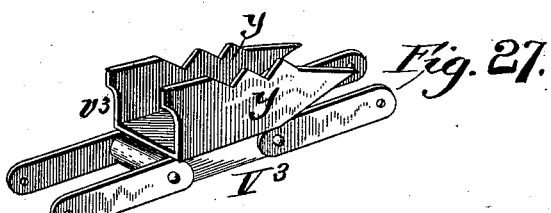

Figure 1 is a perspective view of the filling and capping machine. Fig. 2 is a side elevation, partly sectional, of a complete machine. Fig. 3 is a similar view of a modification at right angles to that shown in Fig. 2, the labeling device being shown in distorted position for clear illustration. Fig. 4 is a detail in side elevation of the box-holder. Fig. 5 is a top plan view of the box-carrier. Fig. 6 is a top plan view of the driving mechanism employed in combination with the construction shown in Fig. 2. Fig. 7 is a detail of the lower end of the box-chute. Fig. 8 is a detail in side elevation of the measuring and filling devices. Fig. 8ª is a modified form of the discharge-spout thereof. Fig. 9 is a side elevation of the capping device, partly sectional. Fig. 10 is a top plan view of the cap retainers or supports. Fig. 11 is a side elevation, partly sectional, of the hopper. Fig. 12 is a detail in side elevation of the device for steadying the carrier. Fig. 13 is a top plan view of a modified form of driving mechanism employed in combination with the construction, as shown in Fig. 3. Fig. 14 is a sectional elevation of a modified form of measuring device. Fig. 15 is a sectional plan view thereof on the line 15 15, Fig. 14. Fig. 16 is a side elevation in detail of the upper end of the cap-conveyer. Fig. 17 is a top plan view thereof. Fig. 18 is an enlarged sectional elevation of the labeling device. Fig. 19 is a top plan view thereof. Figs. 20 and 27 are details of the box and cap conveyer hooks. Fig. 21 is a detail of the box-retainer at the lower end of the box-feed chute. Figs. 22, 23, and 24 are diagrammatic views of part of the labeling device in different operating positions. Fig. 25 is a detail of the connection between the labeling device and the filling and capping machine. Fig. 26 is a top plan view of the upper end of the conveyers.

Referring to the drawings, in which the same reference-characters relate to corresponding parts in all the views, A indicates a suitable base or foundation upon which rests the frame of the capping and filling machine, the said frame consisting, preferably, of upper and lower plates A' A'', from the latter of which extend the standards $a$, the upper ends of which pass through holes in the outer ends of the arms $a'$ on the plate A', and are provided with nuts $a''$, between which nuts and the arms of the upper plate are confined springs $a'''$, whereby a yielding connection between the upper plates A' and the lower fixed plate A'' is provided, the latter of which plates may be bolted or secured to the base of the foundation, if desired.

Extending upward from the lower plate A'' is a spindle B, preferably provided with a recessed hub $b$, on which spindle is journaled a large bevel driving-gear C, the hub $c$ of which rests, preferably, upon antifriction-rolls $c'$, confined between the two said hubs. Secured to and rotating with the driving bevel-gear C is a box-carrier D, preferably in the form clearly shown in Fig. 5, where it will be seen that this carrier consists of a central disk D', to the upper face of which are attached arms $d$, carrying at their outer ends plungers E, adapted to reciprocate in sockets $e$, formed in said arms, the upper ends of the plungers being provided with heads E' to limit the downward movement of said plungers.

Secured to the upper surfaces of the arms $d$, or forming a part thereof, are brackets having thereon perforated lugs $e'$, through which lugs pass the pintles $f$, projecting from the base of the box-holders F, said pintles being connected by coiled springs $f'$ to either of the fixed lugs $e'$, thus forming spring connections between the box-holders and the carrier sufficiently strong to hold the box-holders normally in upright position, but permitting the box-holders to be turned upon their pintles in the event that a box of greater height than that for which the machine is adjusted should be fed to the holder, as hereinafter more particularly described.

In order to bring the box-holders successively under the box-supply chute, the filling-hopper, and the capping mechanism, and to permit the said box-holders to pause a sufficient time under each of said devices for the accomplishment of their special functions, we provide the following-described mechanism for intermittently rotating the box-carrier.

Mounted in suitable bearings on the lower plate A'' is a driving-shaft G, operated by a belt $g$, leading from any suitable source of power to a pulley $g'$ on said shaft, which shaft is also preferably provided with a loose pulley $g''$, to which the belt may be shifted by any suitable belt-shifting mechanism when it is desired to stop the machine for any purpose. Upon said driving-shaft is fixed a spur-gear H, which meshes with a larger spur-gear H', secured to a counter-shaft G', carrying a mutilated gear H'', whose teeth are interrupted for a portion of its circumference, as shown at $h$, and meshing with the mutilated gear H'' is a pinion I, carried by a shaft I', on the other end of which shaft is a bevel-pinion I'', which meshes with the bevel driving-gear C, the latter of which rotates with the box-carrier D on the spindle B. By this construction it will be seen that as the teeth of the mutilated gear H mesh with the pinion I the latter is caused to turn, thereby transmitting rotary motion to the bevel-gear C and consequently to the box-carrier D, such motion being arrested for a sufficient length of time to secure a proper intermittent rotation of the box-carrier to permit the box-carrier to be brought first under the box-supply chute and receive the box, and, second, to be carried around under the feed-hopper for filling, and, third, to be carried under the capping mechanism for capping, and, fourth, to be carried under the discharging device, which operation is effected by timing the gears in accordance with the number of interrupted teeth on the mutilated gear, so as to rotate the box-carrier a distance circumferentially equal to the distance between the centers of the two successive box-holders before its motion is arrested.

In order to insure a smooth starting of the box-carrier, we preferably provide a spring-actuated steadying or buffer rod $l^2$, slidably mounted on an arm $a^{iv}$, provided with a slot $a^v$, engaging a screw $a^{vi}$ on a standard $a$ or other suitable support extending upwardly from the lower plate A''. This arm with the rod carried thereby is normally retracted by a coil-spring $s^{vi}$, and the outer end of said arm is provided with a recess $c^v$, adapted to be engaged by a pin $a^{vii}$ on the crank-disk V. Upon starting the machine these parts are so arranged that when the teeth of the mutilated gear H'' engage with the pinion I the pin $a^{vii}$ will have engaged the recess $c^v$ on the arm $a^{iv}$, moving said arm and the buffer-rod carried thereby in the direction of the arrow, Fig. 12, and driving the end of the rod $l^2$ into yielding contact with the lower end of the plunger E, thus preventing any jar to the carrier as the same is started.

The boxes are fed to the machine by suitable conveyers, which will be more particularly described hereinafter, and are discharged downwardly with the open ends up through a suitable chute K, down which they pass until they reach the lower end of said chute, where they are arrested and supported by a spring-actuated retainer or support $k$, which is mounted upon a sleeve $k'$, journaled on one of the standards $a$, upon which sleeve is a cam projection $k''$, against which projection presses a leaf-spring $k'''$, so arranged as to normally hold the retainer across the bottom of the chute and support the boxes in said chute during the rotation of the box-carrier, Fig. 21.

The empty-box holder actuates the retainer $k$ by coming in contact therewith, thus displacing said retainer and allowing the lower box in the chute to drop into the holder, and in its further movement toward the filling-hopper the box and holder pass beyond the retainer, releasing the same and allowing it to resume its normal position under the chute to support the boxes therein.

At the lower end of the box-chute K are two hinged doors $k^{iv}$, normally held closed by means of suitable springs $k^v$, which doors are opened by the box when the latter is moved out from under the chute by the rotary carrier, the doors closing and the box-retainer $k$ returning to its normal position under the chute after the box passes toward the filling device, the movements of the box and box-holder thus effecting the operation of both the retainer $k$ and the doors $k^{iv}$.

As the empty box is brought under the filling-hopper, a lever L, fulcrumed on the lower plate A″, is moved upward against the lower end of the plunger E by means of a continuously-rotating cam $l$, mounted on a shaft L′, which is journaled on the lower plate at right angles to the counter-shaft G′ and is operated by intermeshing bevel-gears $g'''$ and $l'$ on the two said shafts, Fig. 13.

As the empty box is raised by the plunger E, through the mechanism just described, its top moves into contact with a ring M, flexibly connected to the lower part of the measuring-chamber N by means of a rubber or other suitable yielding tube $m$, which movement causes the measuring device to discharge one of its chambers into the box and to fill the same in the following manner:

The measuring-chamber N, preferably cylindrical in form, is situated at the lower end of the hopper O and is preferably closed by two covers $n$, from one of which projects a spindle $n'$, upon which spindle is rotatably mounted a hub $n''$, from which projects a suitable number of vanes P, dividing the said measuring-chamber into a suitable number of compartments $p$.

On the hub $n''$ of the measuring-wheel are pins $p'$, corresponding in number to the compartments and located opposite the vanes or partitions and so arranged as to be engaged by the bifurcated upper end $p''$ of the spring-pawl Q, mounted on the ring M. As the ring M is moved upward by the box the bifurcated pawl Q engages one of the pins $p'$, thereby turning the measuring-wheel into position shown in Fig. 8, thus discharging the contents of the lower chamber into the box and bringing the empty chamber below the hopper-discharge in position for filling from the hopper. If a box is presented which is not tall enough to turn the measuring-wheel sufficiently to completely discharge the lower chamber into the box as the box is lowered when the cam $l$ moves out of engagement with the lever L, a second bifurcated spring-arm Q′, similarly carried by the ring M and provided with a hooked upper end $q$, engages one of the pins $p'$ in its path downward, thus turning the measuring-wheel so as to cause it to completely discharge the contents of the lower compartment.

While we have shown and described the yielding tube forming the spout of the hopper as made of rubber or other similar material, it is to be understood that we do not limit ourselves to this specific construction, as the said spout may be formed of telescopic tubes, as shown, for example, in Fig. 8ª, or in any other suitable manner whereby the said spout may be caused to yield under pressure of the upwardly-moving box.

In filling the box in order to insure the thorough discharge of the material to the measuring-chambers we provide inside of the hopper at the bottom a scraper $q'$, mounted on the vertical shaft $q''$, driven by intermeshing bevel-gears $q'''$, one carried by a shaft R, journaled on the top of the hopper O and driven by a sprocket-chain $r$, leading from a sprocket-wheel $r'$, mounted on the conveyer-driving shaft V′, which is journaled in suitable bearings above the hopper. Upon the shaft $q''$ we also preferably mount one or more stirrer-blades $q^{iv}$, which blades keep the material thoroughly agitated and facilitate the feeding of the same to the measuring-chamber below and, acting in conjunction with the scraper, prevent the material from adhering to the sides of the hopper. After the box is filled the holder containing it is lowered to its normal position on the carrier, and the latter is caused to move by the intermittently-operated gearing hereinbefore described into the position under the capping device, an empty box being at the same time brought under the filling and measuring devices.

We will now describe the mechanism for placing the cap or cover on the box and fixing it into position thereon.

Mounted upon a shaft G′ is a cam $g'''$, which as it rotates with said shaft (see Fig. 9) engages a lever L″, fulcrumed on the lower plate A″ of the frame, and is so timed as to raise said lever into the path of the plunger E as it comes into position under the cap $c''$, held in position over an opening in the plate A′ at the lower end of the cap-chute or slideway T by means of two cap-retainers or arms $s$, fulcrumed on the lower side of the plate A′ and normally pressed toward each other by means of springs $s'$, the two arms being provided with intermeshing segmental racks $s''$ to cause them to operate together. These arms or cap-retainers are preferably beveled on their lower sides, as shown at $s'''$, so as to permit the box B′ to readily push them outward as the said box is forced upward into the cap $c''$, as shown in Figs. 9 and 10. The cap is fed into the cap-chute or slideway T by suitable conveying mechanism, one form of which will be hereinafter described, and passes it into position in the opening in the plate A', where it is held in place by the cap-retainers underneath the platen or die T', which platen or die is preferably shaped on its under side to conform to the contour of the top of the cap or cover. This platen is carried by a lever $t$, fulcrumed on the top of the plate A', through the outer end of which lever loosely passes a rod $t'$, the lower end of which is secured to a lever L''', fulcrumed on the lower plate A'', the said lever passing under the shaft G' in proximity to a disk S', mounted on said shaft, on which disk is a pin $s^{iv}$, projecting into the path of the spring $t''$, carried by the lever L''', and also adapted to engage a cam-surface $s^{vi}$ on upper side of said lever. The box B' now being held in its highest position under the cap, the pin or roller $s^{iv}$ comes into contact with the upper side of the cam on the lever L''' as the disk S' rotates, pressing said lever down, thereby forcing the platen T' against the cap through the medium of the rod $t'$ and the lever $t$, thus pressing the cap or cover firmly into position on the box. The cam $g'''$ is now disengaged from the lever L''', thus relieving the upward pressure on the plunger E, and through the pressure of the spring $s^v$, confined between the thumb-nut $t'''$ on the upper end of the rod $t'$ and the lever $t$, the parts are returned to their normal position, which operation is further insured by the action of the roll or pin $s^{iv}$ on the spring $t''$, secured to the lever L''' as the said roll comes into contact with the under side of said spring in the further rotation of the disk S'. When this operation has been completed, the carrier is rotated to bring another box-holder into position under the feed-chute, the filling and measuring device, and the capping device, the capped box being at the same time carried around between two gripping-jaws U, pivotally mounted upon a lever U', which is fulcrumed on the upper plate A', the said jaws being connected by a light spring $u$, attached thereto between their faces. Connected to the lever U is a pitman-rod $u'$, engaging a pin $v^{iv}$ on the continuously-rotating disk V, mounted on the shaft L', the operation of these parts being so timed that as the carrier rotates and pushes the filled and capped box between the gripping-jaws U the latter will be raised, so as to remove the filled box from its holder, retaining it in position until the next movement of the carrier, when it is lowered, so that the next filled box will push the box so held free from the jaws onto the way leading to the labeling-machine.

We will now describe the conveyer mechanism for carrying the boxes and caps to their respective chutes.

Referring to Fig. 2, showing a side elevation of our preferred form of machine, V' indicates a shaft mounted in suitable bearings carried by suitable supports $v$, upon which shaft is fixed a sprocket-wheel $v'$, operated by a spocket-chain V'', which is driven by a sprocket $v''$ on the driving-shaft G. (See also Fig. 26.)

Mounted upon the shaft V' are two conveyer-sprockets V''', around which lead the conveyer or elevator chains V² and V³, each passing around suitable sprockets V$^{iv}$, journaled in chambers or receptacles W W', in which the empty boxes and caps are respectively placed. The chain V² is arranged for conveying the boxes, the upper run of which passes through a conveyer-trough $w$, the upper run of the cap-conveyer V³ similarly passing through a conveyer-trough $w'$ for the caps.

Secured to the links of the conveyer-chain V² are hooks $v^2$, adapted to engage the open end of the box as the upper run of the chain passes through the receptacle containing the boxes, so as to carry the said boxes upward and over the sprocket V''', over which the box is carried and delivered into the box-chute K bottom downward.

In order to insure the presentation of the boxes in proper position to the box-chute, we provide on each side of the box-chain spring trip-arms $w''$, with their free ends curved upwardly and so located as to engage the box when presented sidewise, causing it to ride up the arms and thereby releasing it from the hooks $v^2$, so that said box will roll down into the receptacle W. If the box should be caught with the open end up, lying longitudinally of the chain, it will likewise be engaged by the trip-arms $w''$, and as the hooks $v^2$ cannot hold the box in such position to prevent its displacement by said trip-arms said box will be turned thereby and will roll back into the receptacle. It will be observed that these hooks or fingers are so proportioned as to enter the open end of the box and hold it firmly into position on the conveyer-chain, so that when the box arrives at the trip-arm the latter will yield and allow it to pass when properly presented, thus insuring at all times the delivery of the box properly to the box-chute.

The conveyer or elevator chain for the caps is provided with hooks or fingers $v^3$ for engaging the under side of the caps, so that when they arrive at the top of the chain they may be delivered to the cap-chute or slideway T in proper position.

The hooks on the conveyer-chain are preferably of the form shown and consist of two sides $y$, each having upper serrated edges, united by a transverse web which is secured to the links of the chain, and so arranged as to engage the under side of the cap as the upper run of the chain passes through the receptacle W', the edge of the cap resting in one set of the notches of the serrated edges so as to be firmly held on the chain; but should the cap be caught by the hook when it is top down we provide means for turning said cap over into proper position before it reaches the delivery end of the conveyer, such means preferably consisting of two cam-plates $v^4$, secured to the sides of the conveyer-trough on each side of the chain and projected slightly above the upper run of said chain in the path of the cap, so that when the cam engages said cap the advancing edge thereof is raised above the chain until the cap becomes top-heavy and is turned over onto the hook or finger in the proper position.

The conveyer or elevator for the caps and boxes may be modified without departing from our invention, the construction described being simply a preferred form which we have used with success, and instead of chain conveyers belt conveyers of suitable form may be adopted.

It sometimes happens that two or more caps telescope in the receptacle W' and are caught and carried in this position by the chain, and in order to prevent the delivery of the caps in such position to the cap-chute or slideway, which would necessitate a stoppage of the machinery to clear said chute, we provide the mechanism shown in detail in Figs. 16, 17, and 26, where $v^5$ is a lever fulcrumed on a fixed part of the machine—the upper end of the conveyer-trough, if desired—the said lever being located in the path of the moving cap and normally pressed downward by a spring $v^6$ and retained a sufficient distance above the chain to permit a single cap to pass thereunder. Forming a part of or secured to said lever $v^5$ are two arms $v^7$, the outer ends of which are connected to two levers $v^8$ by a hinged joint, the trip-levers $v^8$ being fulcrumed on a fixed part of the machine and normally held in a position shown by dotted lines, Fig. 16. When two or more caps telescope and pass under the lever $v^5$, they cause the same to be raised, because of the increased height of said caps, and the inner arms of the levers $v^8$ are depressed, thus forming a slideway for the caps, which are diverted from their course and are caused to slide down the arms or levers $v^8$ into a chute $v^9$ or other receptacle, whence they may be gathered and placed in the cap-receptacle for feeding to the machine again.

In Figs. 3 and 13 we have shown a slightly-modified arrangement of the driving mechanism, in which it will be seen that the sprockets V''' for the conveyer-chains are mounted on troughs located one above the other instead of terminating in the same plane, and the driving-chain for the vertical stirrer-shaft leads directly from the driving-shaft G to the horizontal shaft R on the top of the hopper. In this case the two conveyer-sprockets may be geared together by sprocket and chain, as shown, and either shaft operated from the main source of power or from any of the moving parts of the machine.

In Figs. 14 and 15 we have shown a modified arrangement of measuring device which may be substituted for the flexible or telescopic spout and measuring-chambers, if desired. This measuring device is, however, particularly adapted for use in filling tin cans or other receptacles where it is necessary to have them filled even with the top, the material being discharged directly into the can or receptacle instead of through a measuring chamber or spout, which latter may be readily removed and the modified form substituted therefor. In this form of measuring device $a^2$ is a plate or disk having an aperture $a^3$, corresponding to the aperture in the bottom of the hopper, and fixedly mounted upon the spindle $a^4$, secured to a bracket $a^5$, attached to the side of the hopper. Journaled upon said spindle below the plate or disk $a^2$ is a star-shaped wheel $a^6$, the indentations or recesses of which correspond in number to the number of box-holders on the box-carrier, which recesses are adapted to be engaged by the boxes as they move under the hopper. Confined between the plate $a^2$ and this star-wheel is a thin disk $a^7$, of metal or other suitable material, provided with perforations $a^8$, corresponding in number to the number of box-holders, the said perforations or apertures registering with the indentations of the star-wheel. In operation, as the box or can comes in contact with the points of the star-wheel it rotates the latter until it brings one of the apertures $a^8$ in register with the aperture $a^3$ in the disk or plate $a^2$, and the box is filled during the period of rest of the rotary carrier and then it is moved away, rotating the wheel until one of the apertures $a^8$ is on each side of the aperture $a^3$ in the disk $a^2$, thereby completely closing the outlet or opening in the hopper until another box can engage the star-wheel and repeat the operation above described. The disks $a^2$ and $a^7$ are preferably separated by a thin piece of felt $a^9$ or other suitable material, attached to the upper disk for the purpose of keeping the plates or disks clean and free from the material and also to prevent friction and wear. It will be observed that in the operation of this measuring device no raising or lowering of the box is necessary, and consequently the mechanism employed in the construction hereinbefore described for effecting this operation is thrown out of action when this modified form of measuring device is used.

We will now describe the labeling device, which is best shown in detail in Figs. 2, 18, and 19, and in the diagrammatic views, Figs. 22 to 24, and Fig. 25.

Extending from the frame of the capping and filling machine is an inclined way $B^2$, onto which the filled and capped box is discharged in the manner hereinbefore described and down which the said box rolls to the labeling-machine, which is shown in Figs. 2 and 3 in exaggerated position for the purpose of clearer illustration. In this labeling device $A^2$ is a suitable framework, preferably having imperforate lower portions, between which are confined the labels $L^2$ of a suitable size and shape for the boxes, said labels being supported upon a vertically-movable plate $p^2$, supported by a screw-threaded rod $s^3$, the upper end of which is provided with a worm-gear $g^2$, which engages with a worm $g^3$ on the shaft $g^4$. This shaft is provided with a bevel-gear $g^5$, which meshes with bevel-gears $g^6$ on the two shafts $g^7$, so that when either of the shafts $g^7$ is rotated it will cause the worm-gear $g^2$ to rotate, thereby elevating the screw-rod $s^3$, thus raising the plate $p^2$ and labels carried thereby.

Mounted on shafts $g^7$ are crank-disks $g^8$, having pins $g^9$, engaging slots in the arms $r^2$, at the lower ends of which arms are carried brushes $r^3$, normally held in the paste-chambers $r^4$ in position to receive the paste from the paste and agitating arms $r^5$, extending from shafts $r^6$, rotatably mounted in said paste-chambers and operated in unison by the bevel-gears $r^7$ on the shaft $r^8$. Motion is transmitted to one of the shafts $r^6$ by a sprocket-chain $r^9$, operated from the shaft $r^{10}$, connected with the driving-shaft G by a sprocket-chain $r^{11}$. The arms $r^5$ act as agitators to keep the paste stirred, and also perform the function of applying paste to the brushes in case the paste in the chambers falls below the lowermost position of the brushes in the chambers, and, further, act as scrapers to remove the surplus paste from the brushes when the latter dip below the level of the paste.

Fulcrumed on the frame of the labeler is a finger $t^2$, to which is pivotally connected a bar $t^3$, having at its outer end a rack engaging a pinion $t^4$ on one of the shafts $g^7$. This pinion is confined to this shaft by a suitable clutch $t^9$, so as to rotate the said shaft only when the rack-bar $t^3$ is moved in one direction, the reverse movement of said bar rotating the pinion loosely on the shaft. Any form of clutch for effecting this movement may be employed, one form being shown in Fig. 19, the purpose of which is to allow the brushes to receive paste and permit the labeler to remain inoperative until the box is carried to the label. The finger $t^2$ is normally held outward from the machine, so as to have its lower end in the path of the box, as shown in Fig. 22, a suitable spring $t^6$ returning the said finger to the position shown in Fig. 24 when it has been released. Secured to the shaft $r^{10}$ is the finger $t^5$, which continuously rotates in the path of the box as it rolls down the incline. When a box rolls into contact with the finger $t^2$, it is held in that position until the finger $t^5$ comes into contact with the box, which finger, by its further rotation, pushes both the box and the finger $t^2$ toward the labeler, thereby causing the rack-bar $t^3$ to turn the pinion $t^4$, which communicates motion to the shafts $g^7$, thus causing the crank-disks $g^8$ to raise the brushes $r^3$ from the paste-chamber and swing them toward each other over the edges of the top label, as shown in Fig. 23. The parts being in this position the finger $t^5$, continuing its movement, pushes the boxes farther against the finger $t^2$ and under the same until the box is engaged by the continuously-moving belt $t^7$, which movement also causes the brushes $r^3$, through the rotation of the crank-disk $g^8$, to return to the paste-chamber, the box being then drawn by the belt over the back of the brush and over the label, which adheres to the box, and the said box is finally discharged at the opposite end of the machine into a suitable receptacle.

The movement of the brushes toward each other is accomplished by the relative arrangement of the pins $g^9$ on the crank-disks, the slots on the arms $r^2$ being shaped and proportioned so as to secure lost motion for a sufficient time to permit the brushes to remain in their respective chambers, so that the box may roll over the back of the first brush to the label and under the conveyer-belt $t^7$, the different positions assumed by the finger and brushes and operating parts being clearly shown in Figs. 22 to 24.

Fig. 22 shows a box in the first contact with the finger $t^2$ and the finger $t^5$ in the act of pushing said box toward the labeler. Fig. 23 shows the second movement, which effects the raising of the brushes and the application of the paste to the label, and Fig. 24 shows the last movement, when the brushes have been returned to the paste-chamber and the box is being rolled over the back thereof by the action of the belt.

From the foregoing description it will be seen that the box controls the mechanism for raising the label into position and the mechanism for applying paste thereto, the elevation of the label being thus dependent upon the movement of the box through the labeling device, and while we have shown and described a preferred form of mechanism for accomplishing these desired functions we do not limit ourselves thereto, as other forms may be adopted whose operation may be controlled by the box in its movement through the labeler, thus embodying the broad feature of this part of our invention.

The belt $t^7$ may be mounted in adjustable bearings, as shown, for the purpose of varying the distance between the top of the label and itself for different-sized boxes, and may be driven from the shaft $r^6$ by means of a belt connection $t^8$ or in any other convenient manner.

The labeling device is shown in exaggerated positions in Figs. 2 and 3, but in Fig. 26 we have shown more accurately the preferred location thereof, by reference to which figure it will be seen that a bracket Z extends from the side of the frame of the filling and capping machine, upon which bracket the frame of the labeler is mounted, thus bringing the two devices in close proximity to each other, economizing space by making the machine more compact.

The operation of our machine will be clearly understood without further detail from the foregoing description, by which it is seen that at such intermittent movement of the box-carrier a box is discharged from the machine filled with the material, capped, and labeled, and in this operation the auxiliary or supplementary pawl mechanism for effecting the delivery of the complete charge from a measuring-chamber insures a uniform amount of material to each box, while the trip-arms for intercepting and diverting telescoped caps, the cams for properly positioning an inverted cap, the box-tripping arms and the hinge-joint connection between the box-holders and the carrier all contribute to secure a continuous action of the machine, rendering stoppages of the machine under ordinary circumstances wholly unnecessary. The bell-crank arms for retaining the caps in position have been shown as connected by segmental racks to cause them to operate in unison, but it is obvious that other means may be adopted for the purpose without departing from our invention, and likewise changes may be made in the specific auxiliary device for assisting the return of the capping mechanism to its normal position.

Furthermore, it will be observed that the various mechanisms for feeding the boxes, the caps, the material, and for applying labels to the boxes are all actuated from one driving-shaft, and their operations are made dependent upon the movement of the box after it is fed to the carrier, the labeling device being directly controlled by the movement imparted to the box by the discharging mechanism of the filling and capping machine.

While we have shown the preferred form of our invention, it is to be understood that various changes may be made in the details thereof without departing from the essential features, and in this connection it may be stated that the various parts may be proportioned and adjusted to suit different sizes of boxes, the plungers, for example, being interchangeable with plungers having thicker or thinner heads for the reception of boxes of different heights, while the capping and labeling devices may obviously be adjusted for boxes of different lengths and diameters, as desired.

We may also state that the labels are preferably long enough to overlap the line of division between the cap and box, so that the cap may be sealed to the box by the label.

We claim as our invention—

1. In a machine for filling boxes &c., the combination of an intermittently-rotating carrier having box-holders thereon, a chute for conveying the boxes to said holders, mechanism for intermittently rotating said carrier to bring the holders under the chute for receiving boxes therefrom, a retainer normally located under the chute for supporting the boxes therein, and arranged in the path of the box-holders so as to be moved from said position by the box-holders, as the latter move under the chute, substantially as described.

2. In a machine for filling boxes &c., the combination of an intermittently-rotating carrier, having box-holders thereon, a chute for conveying boxes thereto, mechanism for intermittently rotating the said carrier to move the holders under the chute for the reception of the boxes, a box-retainer located at the bottom of the chute for supporting the boxes therein, means on the carrier for operating said retainer to release the lower box as the holders are moved under the chute and permit the said box to drop into the holder under the chute, and means for filling the boxes as they are successively brought to rest, substantially as described.

3. In a machine for filling boxes, &c., the combination with a rotary carrier, and means for intermittently rotating the same, of box-holders mounted on said carrier, and movable plungers mounted on the carrier below the holders, a chute for delivering the boxes to the holders, a hopper for feeding material to the boxes, and means for elevating the plungers to raise the boxes vertically within the holders as the same are brought to rest under the hopper to cause the delivery of material from the hopper to the boxes whereby the boxes are guided in their upward movement by the holders, substantially as described.

4. In a machine for filling boxes &c., the combination with a rotary box-carrier and means for intermittently rotating the same, of box-holders mounted on said carrier, means for feeding empty boxes successively to said holders, a hopper for feeding material to the boxes, a measuring device located on said hopper and arranged to discharge the material into the boxes as they are brought to rest under the same, and mechanism for elevating the boxes to cause them to operate said measuring device to discharge the material into the said boxes, substantially as described.

5. In a machine for filling boxes &c., the combination with an intermittently-rotated box-carrier, of box-holders mounted on said carrier, means for feeding empty boxes to said holders in succession, and a hopper for feeding material to the said boxes, a measuring device located on said hopper and arranged to discharge the material into the boxes as they are brought to rest under the same, a yielding discharge-spout on said measuring device, operating connections between said spout and measuring device, and means for elevating the boxes into contact with said spout to cause it to operate the measuring device, substantially as described.

6. In a machine for filling boxes, &c., the combination with an intermittently-rotated carrier upon which the boxes are held, of a filling-hopper having at its lower end a measuring-chamber, a measuring-wheel rotatably mounted in said chamber and provided with vanes dividing the chamber into compartments, and mechanism operated by the box to cause the said wheel to rotate and discharge one of the compartments therein, as said box is brought to rest under the same, substantially as described.

7. In a machine for filling boxes &c., the combination with an intermittently-rotated box-carrier upon which the boxes are held, of a filling-hopper having at its lower end a measuring-chamber, a measuring-wheel rotatably mounted therein, provided with vanes forming compartments into which the material is discharged from the hopper, a yielding spout-discharge from said measuring-chamber, connections between the lower end of said spout and the hub of the measuring-wheel, and mechanism for raising the boxes into contact with said spout to cause the measuring-wheel to rotate and discharge material from one of the compartments into the boxes as they are successively brought to rest under the said spout, substantially as described.

8. In a machine for filling boxes &c., a filling and measuring device comprising a hopper having at its lower end a measuring-chamber, a rotatably-mounted measuring-wheel in said chamber, a yielding discharge-spout on the measuring-chamber, a pawl carried by the spout, in combination with a rotary carrier having the boxes thereon and means for raising said boxes into contact with the spout to cause the pawl to engage the hub of the measuring-wheel, thereby discharging one compartment of the measuring-wheel into the boxes successively, substantially as described.

9. In a machine for filling boxes, &c., a filling and measuring device consisting of a hopper having a measuring-chamber on its lower end, a measuring-wheel rotatably mounted therein, a yielding discharge-spout on said measuring-chamber, a pawl carried by the spout and adapted to engage the hub of the measuring-wheel, means for operating said pawl to cause it to turn said measuring-wheel and deliver a charge through the spout, and a second pawl carried by the spout arranged to turn the wheel, so as to complete its movement for delivering a charge of material when the spout is not raised sufficiently to accomplish this result, substantially as described.

10. In a machine for filling boxes &c., a filling and measuring device consisting of a hopper having at its lower end a measuring-chamber, a measuring-wheel rotatably mounted therein, a yielding discharge-spout on said measuring-chamber, a pawl carried by the spout and adapted to engage the hub of the wheel in its upward movement, a second pawl carried by said spout adapted to engage the opposite side of the hub of the wheel on the downward movement of the spout, when the first pawl fails to turn the wheel a sufficient distance to completely discharge the contents of one of the lower compartments, in combination with a rotary carrier on which the boxes are held, and means for raising said boxes into contact with the spout, substantially as described.

11. In a machine for filling boxes &c., the combination with an intermittently-operated box-carrier, of a chute for delivering empty boxes to said carrier, a spring-actuated box-retainer normally held in position under the chute and supporting the boxes therein, and adapted to be displaced by the carrier as the latter is brought under the chute, whereby the lower box in the chute may be delivered vertically downward to the carrier, substantially as described.

12. In a machine for filling boxes &c., the combination with an intermittently-operated box-carrier, of a chute for delivering empty boxes to the said carrier, a spring-actuated retainer, fulcrumed on a fixed part of the machine and normally held under the chute and supporting the boxes therein and adapted to be displaced by the carrier as the latter is brought under the chute, whereby the lower box in the chute may be delivered to the carrier, substantially as described.

13. In a machine for filling boxes &c., the combination with an intermittently-operated carrier, of a chute for delivering empty boxes to the carrier, a retainer normally held under the chute and supporting the boxes therein, one or more hinged doors normally closing one side of said chute at the bottom, the said retainer being first displaced by the carrier as it is brought under the chute thereby permitting the box to be delivered to said carrier and said doors being opened by the box on the carrier, as the latter moves from the chute, substantially as described.

14. In a machine for filling boxes &c., the combination with an intermittently-operated box-carrier, of box-holders mounted on said carrier, a chute for delivering empty boxes to said holders, a retainer normally held in position under the chute to support the boxes therein and so arranged as to be displaced by the box-holders as they are moved under the chute by the carrier, with a spring mounted on the frame of the machine for returning said retainer to its normal position when released by the box-holders in their movement away from the chute, substantially as described.

15. In a machine for filling boxes &c., the combination with an intermittently-operated box-carrier, of a box-holder attached to said carrier by a hinge-joint and normally held in upright position, a chute for conveying boxes to said holder under the end of which chute the box-holder is adapted to pass and receive the boxes, whereby the said holder may turn on its joint, when a box of greater height than that for which the parts are adjusted is fed to the holder, substantially as described.

16. In a machine for filling and capping boxes, the combination with a rotary carrier, having brackets on said carrier, box-holders connected to said brackets by a hinge-joint and normally held in upright position thereon, a chute for conveying the boxes to the holders as they pass under the end of the same whereby the said holders may be tilted when a box of greater height than that for which the machine is adjusted is fed to the holder, substantially as and for the purposes set forth.

17. In a machine for filling and capping boxes, the combination with a rotary carrier, having a bracket thereon provided with perforated lugs, of a box-holder having pintles extending from the sides thereof through the perforations of the lugs, and a spring connection between the bracket and box-holder, substantially as and for the purposes described.

18. In a machine for filling and capping boxes &c., the combination with a rotary carrier, and means for intermittently rotating the said carrier, of box-holders mounted on the carrier by hinge-joints and normally held in upright position thereon, a chute for carrying boxes to said holders, as the latter are brought under the said chute, a hopper for filling said boxes successively as they are brought under the same whereby the said holders may be tilted when a box of greater height than that for which the machine is adjusted is fed to the holder, substantially as and for the purpose set forth.

19. In a machine for filling boxes &c., the combination with a rotary carrier, and means for intermittently rotating the said carrier, of box-holders mounted on said carrier, a chute for conveying boxes to said holders as the latter are brought under the chute, a retainer at the bottom of the chute operated by the box-holders to release the lower box in the chute, and adapted to resume its normal position under the chute when the box-holder passes away from the chute, a filling-hopper having measuring devices thereon and means controlled by the box for causing said measuring device to deliver a charge of material to the box as it comes to rest under the same, substantially as described.

20. In a machine for filling boxes &c., the combination with a rotary carrier, and means for intermittently rotating the same, a chute for conveying the boxes to said carrier, a retainer normally held under the chute to support the boxes therein, box-holders on said carrier adapted to displace the retainer as they come under the chute for receiving the boxes, said retainer being returned to its normal position when released by the box-holders as the latter move away from the chute, a filling-hopper provided with a measuring device having a yielding discharge-spout, connections between said spout and measuring device, and means for causing the boxes to raise said spout to operate the measuring device, substantially as described.

21. In a box filling and capping machine, the combination with a rotary carrier adapted to receive the boxes, means for intermittently rotating said carrier, and means for delivering the empty boxes thereto, of a filling-hopper provided with measuring devices operated by the boxes to cause the same to be filled with material from the hopper, mechanism for capping the filled boxes, a chute or slideway for feeding caps thereto, and means for discharging the capped box from the machine, substantially as described.

22. In a capping and filling machine, the combination with the rotary carrier, adapted to hold the boxes thereon, in upright position, a chute for feeding empty boxes to said carrier, mechanism for filling said boxes, and mechanism for capping said boxes, with mechanism for rotating the carrier intermittently to cause the aforesaid feeding, filling and capping operations to be effected simultaneously, whereby a filled and capped box may be discharged from the machine at each movement of the carrier, substantially as described.

23. In a filling and capping machine, the combination with a rotary carrier, of means for intermittently rotating said carrier, mechanism for feeding empty boxes to said carrier, mechanism for filling said boxes, and mechanism for capping the same, with grippers located in the path of the moving boxes for lifting a box from the carrier and holding it in the path of the succeeding box, whereby the latter may push said box from the grippers, substantially as described.

24. In a machine for filling and capping boxes, the combination with the rotary carrier, adapted to hold the boxes in upright position thereon, means for intermittently rotating said carrier, mechanism for feeding empty boxes to said carrier and mechanism for filling the boxes and mechanism for capping the same, of a gripping device located in the path of the moving boxes adapted to seize the filled and capped box, as it passes between the jaws of said gripping device to lift the box from the carrier, whereby the said box may be discharged from the machine by contact with the succeeding box on the carrier, substantially as described.

25. In a machine for filling and capping boxes, the combination with the rotary carrier adapted to hold the boxes in upright position thereon, means for intermittently rotating said carrier, mechanism for feeding empty boxes to said carrier, mechanism for filling the boxes, and mechanism for capping the same, of a gripping device located in the path of the moving boxes adapted to seize the filled and capped box as it passes between the jaws of the gripping device, and a rotary cam with connections for lifting said gripping device and lowering it in the path of the succeeding box, substantially as described.

26. A discharging device for filling and capping boxes, consisting of gripping-jaws mounted on a lever fulcrumed on a fixed part of the machine, and located in the path of the moving box, a shaft rotated in bearings on the frame of the machine, a cam on said shaft, means for driving said shaft, and connections between said lever and cam, whereby the gripping-jaws may be raised to lift a box from the carrier, substantially as described.

27. In a machine for filling and capping boxes &c., the combination with a rotary carrier on which the boxes are held and mechanism for intermittently rotating the same, of a chute for feeding caps to the machine, means for holding the lower cap in said chute in position over a box on the carrier when the latter is at rest, mechanism for raising the box into contact with the cap, and a platen above the cap, with means for moving said platen downward against the cap to press the same into place on the box, substantially as described.

28. In a machine for filling and capping boxes &c., the combination with a rotary carrier and box-holders mounted thereon, of means for intermittently rotating said carrier, means for feeding caps to the machine in position to be placed on the boxes, mechanism operated by a moving part of the machine to move the box in the holder upwardly into contact with the cap held over the same during the period of rest of the carrier, with means for pressing the cap into place on the box when the latter is raised, substantially as described.

29. In a machine for filling and capping boxes, &c., the combination with a rotary carrier, means for intermittently operating the said carrier, of box-holders on the carrier arranged to bring the boxes successively under the capping mechanism, and mechanism for capping said boxes consisting of a platen carried by a lever fulcrumed on the frame of the machine, means for elevating the box-holders and the boxes therein as they come to rest under the platen, and means for forcing said lever and platen downward upon the cap to press it firmly into place on the box, substantially as described.

30. In a machine for capping boxes &c., the combination with a platen vertically movable above the cap, means for holding said cap in position under said platen, a box-holder having a box therein, a movable plunger in said holder supporting the box thereon, and mechanism for moving the plunger upward so as to raise the box upwardly into contact with the cap, and mechanism for moving the platen downward upon the cap to press the said cap firmly upon the box, substantially as described.

31. In a machine for capping boxes &c., the combination with means for holding the cap in position, of a lever fulcrumed on a fixed part, a platen carried by said lever above the cap, a rotary shaft, a box-holder in which the box is held under the platen, a movable plunger in said holder, connections between the shaft and lever for causing a downward movement of the platen to press the cap upon the box, and means for forcing the box upward into the cap, substantially as described.

32. In a machine for capping boxes &c., the combination with the frame of the machine, of cap-retainers adapted to engage and hold the cap in position, a platen above the cap, a box-holder having a box therein, a movable plunger in the holder supporting said box, and mechanism for moving said plunger upward to cause the box to pass between the retainers and release the cap, and means for forcing the platen against the cap to firmly fix the same on the box, substantially as described.

33. In a machine for capping boxes &c., the combination with a box-holder and a box therein, of a plunger vertically movable in said holder and supporting the box, cap-retainers pivoted upon the frame of the machine, and having their lower inner edges beveled, a platen over the cap, means for forcing said platen against the cap, and means for raising the plunger to cause the box to pass between the retainers and receive the cap, substantially as described.

34. In a machine for capping boxes &c., the combination with a box-holder and the box therein, of a plunger mounted in said holder and supporting the box, means for holding the cap in position above the box, an arm fulcrumed on the frame of the machine, a cap-pressing device carried by said arm, a lever located below the box-holder, a rod connecting said arm and lever, a rotary shaft carrying a cam for raising the plunger, and connections between the lever and shaft for causing the cap-pressing device to press the cap into place on the box, substantially as described.

35. In a machine for capping boxes &c., the combination with means for holding the cap in position, a box-holder and box therein, of a rotary shaft with connection between said shaft and the box-holder for raising the box, a lever fulcrumed on a fixed part of the machine and passing below said shaft, an arm carrying a platen pivoted above the cap, a rod connecting said arm and lever, a crank-disk mounted on said shaft provided with a pin or roll adapted to engage the lever and press the same downward, substantially as described.

36. In a machine for capping boxes &c., the combination with the box-holder and the box therein, means for raising said box, of means for holding the cap in position over the box, a pivoted arm above the cap, a platen carried thereby, a rotary shaft, a lever passing under said shaft, a rod connected to the said lever and passing loosely through the platen-arm and connected thereto by a yielding connection, means on the shaft for depressing the lever, and means for raising the lever after the cap has been forced into position on the box, substantially as described.

37. In a machine for capping boxes &c., the combination with the capping-platen and means for placing the cap on the box, of a rotary shaft and operating connection between said shaft and platen for forcing the latter downward against the cap held over the box, means for returning said platen to its normal position, and an auxiliary device operated by the shaft to assist said return movement, substantially as described.

38. In a machine for capping boxes &c., the combination with the capping-platen and means for placing the cap in position on the box, of a rotating shaft, a lever connected with the platen and operated by said shaft, means for returning the platen to its normal position after it has pressed the cap upon the box, a spring carried by said lever and arranged to be raised by a rotating part on the shaft to assist said return movement, substantially as described.

39. In a capping mechanism, the herein-described retainers for holding the caps in position for the capping operation, consisting of arms pivotally supported on the frame of the machine, a yielding connection between the arms to press them normally toward each other for supporting the cap, but permitting of their separation by the upward movement of a box between them, substantially as described.

40. In a capping mechanism, the herein-described cap-retainers, consisting of bell-crank arms pivoted on the frame of the machine, a yielding connection between said arms for causing them to be pressed normally toward each other for supporting the cap, and means for causing said retainers to move in unison when separating from or closing upon each other, substantially as described.

41. In a capping mechanism, the herein-described cap-retainers, consisting of bell-crank arms pivoted on the frame of the machine, a yielding connection between said arms for causing them to approach each other so as to support a cap, and intermeshing racks on said arms for causing them to move in unison, substantially as described.

42. In a machine for filling boxes, &c., the combination with a chute for delivering open-ended boxes to the machine, of a conveyer provided with hooks for engaging the open ends of the boxes and conveying them to the chute, and means for preventing the delivery of a box to the chute when not properly presented, substantially as described.

43. In a machine for filling boxes, &c., the combination with a chute for delivering open-ended boxes to the machine, of a conveyer for carrying boxes to the chute, and trip-arms located alongside of the conveyer in the path of the moving boxes and arranged to displace a box from said conveyer when presented bottom end up or sidewise thereon, substantially as described.

44. In a machine for filling boxes &c., the combination with a chute for delivering open-ended boxes to the machine, of a conveyer having hooks thereon adapted to engage the open ends of the boxes, spring trip-arms located on the side of the conveyer and projecting into the path of the moving boxes, substantially as described.

45. In a machine for filling boxes &c., the combination with a chute for delivering caps to the machine, of a conveyer for carrying caps to said chute, and mechanism for turning said caps over in the proper position on the conveyer when said caps are carried top down thereon, substantially as described.

46. In a machine for filling boxes, &c., the combination with a chute for delivering caps to the machine, of a conveyer for carrying caps to the machine, hooks on said conveyer for holding the caps, and cams located in the path of the moving caps adapted to turn the same over onto the hooks when caught top down on the conveyer, substantially as described.

47. In a machine for filling boxes, &c., the combination with a conveyer for the caps, a chute to which the caps are delivered by the conveyer, of trip-arms located at the delivery end of the conveyer and normally held out of the path of the caps, with means for causing said arms to intercept and divert said caps when two or more become telescoped on the conveyer, substantially as described.

48. In a machine for filling boxes &c., the combination with the conveyer for the caps, a chute for receiving caps from the conveyer, of a lever fulcrumed to a fixed part of the machine and extending above the delivery end of the conveyer, normally at a sufficient distance therefrom to permit a cap to pass under the same, trip-arms normally out of the path of the moving caps, and a connection between said arms and the lever, whereby the said trip-arms are thrown into the path of the cap when two or more become telescoped and pass under the lever, substantially as described.

49. In a machine for filling boxes, &c., the combination with the conveyer for the caps, of a chute for receiving the boxes therefrom, a spring-pressed lever fulcrumed on a fixed part of the machine and normally held a sufficient distance above the conveyer to permit the passage of a single cap thereunder, pivoted trip-arms normally out of the path of the moving cap and connected to said lever, substantially as and for the purpose set forth.

50. In a machine for labeling boxes &c., the combination of a way upon which the box is discharged, a labeling device connected to said way, and means controlled by the box as it rolls along said way for causing the labeling mechanism to be set in motion to first paste the label for the box and apply said label to the box, substantially as described.

51. In a machine for filling boxes, &c., capping and labeling the same, the combination with the discharging mechanism of the filling device, of a labeling device, an inclined way connecting the two devices on which the box falls and rolls when discharged from the filling device, with a finger pivoted to the frame of the labeling device and normally held in the path of the box, a rotating arm arranged to engage the box and press it toward the labeler, with connections between the finger and device for applying the label to the box, whereby the box is caused to receive a label as it rolls over the label-pile, substantially as described.

52. In a machine for labeling boxes, an inclined way leading from the discharging mechanism of a filling and capping machine, means for dropping a box onto said way, a finger pivoted to the frame of the machine against which the box is arrested as it rolls down the way, a rotary arm adapted to engage the box and carry it into contact with the finger toward the labels, means for supporting the labels in the path of the moving box, means for applying paste to the label, and connections between the finger and paste-applying means, substantially as described.

53. The combination with the discharging mechanism of a box filling and capping machine, of a labeling device, an inclined way connecting the two, a plate on said labeling device supporting a pile of labels, a finger pivoted on the frame of the labeling device normally held in the path of the box, means for pushing said box against the finger toward the labeling device, connections between said finger and plate for elevating the labels as the finger is moved by the box, and paste-brushes operated by the finger to apply paste to the top label of the pile, with means for rolling the box over said label, substantially as described.

54. The combination with the frame of a labeling device, of a way on which the box is carried to the same, a finger normally held in the path of the box, a shaft rotatably mounted on the frame of the machine, connections between said shaft and finger for causing the shaft to rotate in one direction, arms having paste-brushes at their lower ends pivoted on the frame of the machine and connected to the shaft, paste-chambers in which said brushes dip, means for supporting the labels in position for pasting, and means for pushing the box against the finger to cause the shaft to rotate, whereby the brushes are raised from the paste-chambers, apply paste to the label and return to the paste-chambers, and means for rolling the box over the label, substantially as described.

55. The combination with the finger pivoted to the frame of the labeling device adapted to arrest the box in its passage thereto, of a shaft journaled on the frame, clutch mechanism between said shaft and finger for causing the shaft to rotate in one direction only, a counter-shaft geared to the first shaft, pivoted brush-arms connected with said shaft, whereby said arms may be raised and moved toward each other and lowered again, substantially as described.

56. The combination with the frame of the labeling device for a box filling and capping machine, of a shaft journaled on the frame of the labeling device, a pinion connected to said shaft by a clutch so as to rotate the shaft in one direction only, a finger pivoted to the frame and normally held in the path of the box, a rack-bar connecting the finger with the pinion, and arms carrying paste-brushes at their lower ends operated by said shaft, with means for moving the finger, substantially as and for the purpose set forth.

57. The combination with the inclined way leading from the discharging mechanism of a box-filling machine, of a shaft operated from the driving-shaft of said filling-machine, an arm on said shaft rotating in the path of the box on the way, a labeling device, a finger pivoted to the frame of said labeling device normally in the path of the box, a crank-shaft journaled on said frame, a pinion on said shaft, a rack-bar connecting said finger and pinion, arms having paste-brushes at their lower end pivoted on said frame and connected to said crank-shaft, a worm-shaft connected to the crank-shaft, a screw-rod provided with a worm-gear meshing with said worm-shaft, a plate supporting labels on said rod, paste-chambers in which the brushes normally dip, substantially as and for the purposes set forth.

58. The combination in a labeling device, of a rotating arm and means for rotating the same, a finger normally held in the path of a moving box, and adapted to be moved by the box as the latter is pushed by the rotating arm, arms carrying brushes at their lower ends pivoted on the frame of the device, paste-chambers in which said arms normally dip, rotating shafts carrying paste supplying and agitating arms in said chambers, and connections between the brush-arms and finger, substantially as and for the purpose set forth.

59. In a box filling and capping machine, the combination with a rotary box-carrier, and means for intermittently rotating said carrier, of a spring-actuated buffer-rod adapted to engage said carrier as the latter is started, substantially as described.

60. In a box filling and capping machine, the combination with a rotary carrier and a mutilated driving-gear, and connections between said gear and carrier, of a spring-actuated buffer-rod arranged to engage and push said carrier with a yielding pressure as the mutilated gear begins to actuate said carrier, substantially as described.

61. In a box filling and capping machine, the combination with a rotary box-carrier, and means for intermittently rotating the same, of box-holding plungers mounted on said carrier and projecting below the same, and a spring-actuated buffer-rod arranged to engage said plungers as the carrier is started, substantially as described.

62. In a box filling and capping machine, the combination with an intermittently-rotating box-carrier, of an arm pivoted to the frame of the machine, a spring-actuated buffer-rod slidably mounted thereon, a rotating shaft having crank-disk thereon, a pin projecting from the said disk, a recess in the arm adapted to be engaged by the pin, whereby the buffer-rod is pressed into contact with the carrier as the latter is started, substantially as described.

63. In a box filling and capping machine, the combination with a main driving-shaft, of a mutilated gear mounted thereon, a countershaft intermittently driven by said gear, a rotary box-carrier driven by said countershaft, mechanism for feeding boxes to said carrier, a filling mechanism for the boxes and the main driving-shaft for operating the same, a capping mechanism, with connections between said capping mechanism and driving-shaft for driving the same, discharging mechanism likewise operated by the driving-shaft, whereby a filled and capped box is discharged from the machine at each movement of the carrier, substantially as described.

In testimony whereof we have signed our names to this specification in the presence of two subscribing witnesses.

PHIL L. HOYTE.
WILLIAM T. WOOD.

Witnesses:
F. E. MILLER,
W. R. ANDERSON.